Patented Nov. 4, 1947

2,430,162

UNITED STATES PATENT OFFICE 2,430,162

BENZOTHIAZYL DISULFIDE-DIARYL-GUANIDINE DERIVATIVES

Arnold R. Davis, Riverside, Conn., assignor to American Cyanamid Company, New York, N. Y., a corporation of Maine No Drawing. Application February 8, 1945, Serial No. 576,908

4 Claims. (Cl. 260—306.5)

This invention relates to a novel vulcanization accelerator, to rubber compositions containing the same and to methods of vulcanization using these accelerators. More specifically, the invention relates to novel "activated" accelerators which constitute fusion products of benzothiazyl disulfide and a diarylguanidine.

For many years, natural rubber and, more recently, synthetic rubber has been vulcanized using as the accelerator benzothiazyl disulfide activated by a diarylguanidine and metal oxides, such as zinc oxides and the like. Benzothiazyl disulfide produces excellent results so far as the physical properties of a properly finished product are concerned. While its use has been quite extensive, improvements have been constantly sought.

Benzothiazyl disulfide has only a very low solubility, less than 0.5%, in rubber at ordinary room temperatures. This leads to a number of difficulties. Compounds which have such limited solubility in rubber as exhibited by benzothiazyl disulfide are extremely difficult to disperse uniformly in the composition. This has the unfortunate effect of producing uneven cures. Poor accelerator distribution results in non-uniform test results and erratic performance in service. This difficulty is aggravated by the ordinary procedure in the plant. Rubber compositions during milling are at elevated temperatures, usually above 60° C. and often at about 100 to 160° C. While the benzothiazyl disulfide may be thoroughly dissolved in the rubber at the high temperature, it is precipitated out when the material cools. In some cases, crystals may even be observed at the surface.

When a compound such as benzothiazyl disulfide is used with another compound to form the actual accelerator, as in the present instance it is used with a diarylguanidine, still further difficulties are encountered. Not only is the material poorly distributed, but, because of the heterogeneous mixing, the chemical reaction between the components of the accelerator is also indifferently accomplished. Again, wide variations in tensile strength, elongation and other physical properties are to be noted in test samples and the products are erratic in service.

It is, therefore, the principal object of the present invention to provide a novel accelerator which will possess the natural advantages inherent in the use of activated benzothiazyl disulfide without being subject to the difficulties encountered when the latter is used per se with activators. It is also an object of the present invention to provide an accelerator which is simply and readily made, which is easily compounded with the vulcanizable composition, and which gives uniform and improved physical properties to the vulcanized product.

In general, the desired objects of the present invention are simply and easily accomplished by recognizing that the essential difficulty is either one of distributing or one of forming the accelerator in the compound. The distributional difficulties are overcome by the use of the novel "activated" accelerators of this invention. The latter constitute amorphous chemical reaction products obtained by the fusion of benzothiazyl disulfide and a diarylguanidine having one mononuclear aryl substituent on each of the amino nitrogens in accordance with the formula

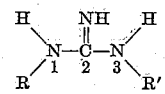

in which R and R' represent the aryl radicals.

The diarylguanidine used in preparing the novel accelerators of the present invention is not necessarily limited to any particular choice. Excellent results are obtained, for example, using such mononuclear substituted guanidines as diphenyl guanidine, the di-tolyl guanidines, phenyl, o-tolyl guanidine, and the dixylyl guanidines. In choosing the particular guanidine to be used, certain precautions should be noted. The dixylyl guanidines when fused alone with benzothiazyl disulfide yield products which exhibit definite crystal phases. Diphenyl guanidine if heated alone with benzothiazyl disulfide at too low a temperature may yield a product showing some crystalline phases. While the formation of crystal phases shows the products are actually chemically combined and not simple mixtures, in use, crystalline forms are not as satisfactory as the amorphous forms. The other diarylguanidines produce substantially amorphous fusion products and cause no trouble in this respect. Where the use of dixylyl guanidines is desirable, the tendency toward crystallization can be readily eliminated by using them in admixture with another diarylguanidine, preferably a ditolyl- or a phenyl, tolyl guanidine.

The exact proportions of benzothiazyl disulfide of diarylguanidine used is not wholly critical. In the experimental work done in the development of the accelerators of the present invention, the most preferable results were obtained using a molal ratio of 1:2. These proportions also simplify calculation when it is desirable to use one of the materials which produce products having crystalline phases. One mol of the crystal-producing guanidine, one mol of the non-crystal-producing guanidine and one mol of the benzothiazyl disulfide are readily combined. When combined, the product has excellent properties. These proportions, however, may be varied by a few percent in either direction without necessarily producing an adverse effect on the vulcanized product. The preferred amorphous products have shown complete solubility even when used to the extent of 3% on the rubber.

Actual preparation of the novel accelerators of the present invention is quite simple. The selected materials, usually in comminuted form, are admixed, the mixture is heated to the fusion temperature and the temperature is held at that point for a short time. The mixture becomes fluid before the maximum temperature is reached. After a few minutes at fusion temperature, the fluid becomes a clear liquid, indicating the occurrence of some chemical change. Fusion temperatures of 120°–150° C. normally cover the expected range.

With the exception of the use of dixylyl guanidines alone, or the use of diphenyl guanidine at too low a temperature, all the fusion products on cooling yield clear, resinous products, which are free from crystalline material. After cooling, all the amorphous products soften at a lower temperature than that at which the mixture of original materials became fluid.

While its exact nature is not wholly understood, the fact that a chemical change occurs during fusion is evidenced in several ways. First, as noted above, the fluent material becomes clear during fusion. Second, the fusion product is completely soluble in rubber, whereas only the diaryl guanidine component of a mechanical mixture dissolves freely, only a small amount of the benzothiazyl disulfide going into solution. Third, a composition containing the fusion product, after curing, possesses much better physical properties than those of vulcanizates from compositions containing only a mechanical mixture.

The invention will be more fully described in conjunction with the following specific examples which are illustrative only and not by way of limitation. All parts are by weight unless otherwise noted. In the examples, the following symbols are used:

BTDS=benzothiazyl disulfide
DPG=diphenyl guanidine
DOTG=di-o-tolyl guanidine
DXG=dixylyl guanidines
POTG=phenyl, o-tolyl guanidine
GR-S=Government Rubber-styrene

EXAMPLE 1

Two mol parts of DPG and one mol part of BTDS were admixed, melted and fused at about 125° C. for several minutes, after the melt became clarified. After cooling a clear amorphous resin softening at 55°–60° C. is obtained. Some evidence of crystal phases was present after long standing.

EXAMPLE 2

A mixture of one mol part each of DXG and BTDS was heated to 150° C. in 17 minutes and held at 145°–150° C. for 8 minutes. The resultant liquid was clear in a thin film but after cooling a considerable quantity of fine crystals was apparent. The product softened at about 66°–71° C.

As was pointed out above, fusion products exhibiting crystal phases are not as satisfactory for use in vulcanization as are the properly prepared amorphous reaction products. As was also pointed out, such tendency to produce crystalline phases is obtained under two conditions. When diphenylguanidine is used alone as the only diarylguanidine, the fusion, if carried out at too low a temperature, may produce a reaction product exhibiting some crystalline phases. This is readily overcome by heating at a higher temperature. This is shown clearly by the following example.

EXAMPLE 3

Example 1 was repeated, heating the mix to 150° C., in 23 minutes and holding it at 145°–150° C. for 5 minutes, the cooled product was found to be amorphous, softening at 52°–57° C.

EXAMPLE 4

Two mol parts of DOTG were fused at about 130° C. with one mol part of BTDS. The resultant product was an amorphous resin softening at 60°–65° C. and free from crystalline material.

EXAMPLE 5

One mol part of DOTG and one mol part of DPG were fused at about 130° C. with one mol part of BTDS. The resultant product was an amorphous solid softening at 57°–62° C.

As was noted above, the other condition under which crystalline phases are likely to be obtained is when dixylylguanidine is used as the only diarylguanidine. Where it is desirable to use dixylylguanidine, this tendency to produce crystalline phases, shown above in Example 2, may be readily overcome by using therewith an equimolar proportion of a non-crystal-producing guanidine such as diphenylguanidine or di-o-tolyl-guanidine. This is illustrated in the following examples.

EXAMPLE 6

One mol part each of DPG, DXG and BTDS were mixed and heated to about 130° C. over 15 minutes and then held at 125°–130° C. for 5 minutes. The clear amorphous product softened at 63°–68° C.

EXAMPLE 7

One mol part each of DOTG, DXG and BTDS heated to 130° C. in 20 minutes and held at that point for about 5 minutes yielded a product on cooling which was amorphous and softened at 64°–69° C.

EXAMPLE 8

One mol part each of DPG, POTG and BTDS heated to 140° C. in 20 minutes and held at 135°–140° C. for five minutes and cooled produced an amorphous product softening at 56°–61° C.

EXAMPLE 9

A mixture of one mol part each of DOTG, POTG and BTDS heated to 125° C. in 15 minutes, held at 125° C. for 10 minutes gave on cooling an amorphous product melting at 59°–64° C.

EXAMPLE 10

The accelerator activity of the products of the present invention may be illustrated as follows. Two portions of a butadiene-styrene copolymer synthetic rubber (GR-S) were compounded and vulcanized, and the resultant physical properties of the vulcanizate tested. In the first, the fusion product obtained in Example 4 was used as the accelerator, and in the second, a diphenyl guanidine-benzothiazyl disulfide fusion product of Example 1 was used. The composition and the resultant properties of the vulcanizate are shown in the following table:

*Table I*

|  | Compounds | |
|---|---|---|
|  | A | B |
| GR-S | 100 | 100 |
| EPC Black | 50 | 50 |
| Zinc Oxide | 5 | 5 |
| Sulfur | 2 | 2 |
| Petroleum Hydrocarbon Softener | 10 | 10 |
| DOTG-BTDS Fusion Prod | 1.20 |  |
| DPG-BTDS Fusion Prod |  | 1.30 |

| Set-up Tests | Williams 3 min. "Y" at 100° C. inches | |
|---|---|---|
| No Heat | 0.116 | 0.115 |
| After 2.5 hrs. in Boiling H₂O | 0.146 | 0.152 |
| Change, per cent | +26 | +32 |

SHORE HARDNESS

| Minutes Cure at 141° C. | (0.5"–30" dwell) | |
|---|---|---|
| 30 | 60–51 | 60–53 |
| 60 | 65–56 | 64–57 |
| 90 | 65–57 | 65–57 |

PHYSICAL TESTS

|  | 60' Cure at 141° C. | |
|---|---|---|
| Modulus at 200% Elongation [1] | 475 | 500 |
| Tensile strength [1] | 2,900 | 3,225 |
| Elongation, per cent | 620 | 625 |
| Set [2], per cent | 25 | 25 |
| Torsional hysteresis at 280° F | 0.148 | 0.150 |

|  | After 48 hrs. Aging at 100° C. | |
|---|---|---|
| Modulus at 200% Elong.[1] | 1,050 | 1,025 |
| Tensil strength [1] | 2,750 | 2,825 |
| Elongation, per cent | 520 | 400 |

[1] Modulus and Tensile in lbs./sq. in.
[2] Set at Break 2 min. after break.

EXAMPLE 11

A similar procedure was carried out on a third sample, using as the accelerator a fusion product obtained according to Example 5. The proportions used and the results obtained are shown in the following table:

*Table II*

|  | Compound C |
|---|---|
| GR-S | 100 |
| EPC Black | 50 |
| Zinc Oxide | 5 |
| Sulfur | 2 |
| Coal Tar Softener | 5 |
| DOTG-DPG-BTDS Fusion Prod | 0.90 |

| Set-up Tests | Williams 3 min. "Y" at 100° C. inches |
|---|---|
| No Heat | 0.134 |
| After 2.5 hrs. in Boiling H₂O | 0.161 |
| Change, per cent | +20 |

SHORE HARDNESS

| Minutes Cure at 141° C. | (0.5"–30" dwell) |
|---|---|
| 30 | 60–51 |
| 60 | 66–58 |
| 90 | 68–60 |

PHYSICAL TESTS

|  | 60' Cure at 141° C., Unaged |
|---|---|
| Modulus at 200% Elongation | 575 |
| Tensile strength | 3,350 |
| Elongation, per cent | 625 |
| Set, per cent | 28 |

|  | After 48 hrs. Aging at 100° C. |
|---|---|
| Modulus at 200% Elong | 1,400 |
| Tensile Strength | 3,200 |
| Elongation, per cent | 380 |

The unpredictable benefits obtained by reacting the components of the "activated" accelerator before the rubber compounding is readily illustrated by the following example:

EXAMPLE 12

Three additional samples of GR-S were compounded. In the first of these samples, the activator and the accelerator were separately added. In the second, a fusion product prepared according to Example 3 was used, and in the third, a phenyl-o-tolyl guanidine benzothiazyl disulfide fusion product was used. In order that the unreacted components be given the most favorable opportunity to react in situ, the powders were very thoroughly mixed before being added to the composition. The proportions and the physical properties of the resultant vulcanizates are shown in the following table, which very excellently illustrates the advantage of using the products of the present invention.

*Table III*

|  | Compounds | | |
|---|---|---|---|
|  | D | E | F |
| GR-S | 100 | 100 | 100 |
| HMF Black | 50 | 50 | 50 |
| Zinc Oxide | 5 | 5 | 5 |
| Sulfur | 2 | 2 | 2 |
| Petroleum Hydrocarbon Softener | 5 | 5 | 5 |
| DPG-DOTG-BTDS Mech. Mix | 1.00 |  |  |
| DPG-DOTG-BTDS Fusion Prod |  | 1.00 |  |
| POTG-BTDS Fusion Prod |  |  | 1.00 |

| Set-up Tests | Williams 3 min. "Y" at 100° C. inches | | |
|---|---|---|---|
| No Heat | .104 | .105 | .104 |
| After 1.5 hr. in Boiling H₂O | .144 | .130 | .131 |
| Change, per cent | +38 | +24 | +26 |

(The lowest percentage change in the "Y" value indicates the lowest tendency to scorch or precure.)

SHORE HARDNESS

| | | | |
|---|---|---|---|
| 45 Minutes Cure at 141° C | 65-59 | 65-58 | 64-57 |

TENSILE TESTS

| | 45' Cure at 141° C., Unaged | | |
|---|---|---|---|
| Modulus ¹ | 750 | 725 | 700 |
| Tensile Strength ¹ | 2,400 | 2,900 | 2,800 |
| Elongation, per cent | 435 | 520 | 505 |

| | After 48 hrs. Aging at 100° C. | | |
|---|---|---|---|
| Modulus | 1,225 | 1,200 | 1,200 |
| Tensile Strength | 2,275 | 2,675 | 2,575 |
| Elongation, per cent | 315 | 370 | 350 |

¹ Modulus (at 200% elong.) and tensile in p. s. i.

While the foregoing discussion has been largely limited to examples using synthetic butadiene-styrene copolymer type rubbers, this has been simply for illustrative purposes. The novel accelerators of the present invention and the use thereof are applicable not only to synthetic vulcanizable polymers other than the butadiene-styrene polymer but also to natural vulcanizable rubber. This is illustrated in the following example.

EXAMPLE 13

A procedure similar to Example 6, using natural rubber and an accelerator produced according to Example 2 was carried out. The proportions used and the properties of the product are shown in the following table.

Table IV

| | |
|---|---|
| Natural Rubber | 100 |
| Whiting | 70 |
| Clay | 9 |
| Furnace Black | 8 |
| EPC Black | 2 |
| Asphalt Base Oil | 3 |
| Zinc Oxide | 5 |
| Sulfur | 2.25 |
| DPG-DOTG-BTDS Fusion Prod | 1.35 |

TENSILE TESTS

| | 25' Cure at 130° C. |
|---|---|
| Modulus at 300%¹ | 850 |
| Tensile Strength ¹ | 2,825 |
| Elongation, per cent | 560 |

¹ Pounds per square inch.

While in the foregoing discussion the improved accelerators of the present invention have been used alone as the sole organic accelerating agent, these products may be used in conjunction with the standard organic accelerators and/or activators if so desired. The novel accelerators of this invention may be supplemented or partially replaced by previously known accelerators, for example, benzothiazyl disulfide itself. However, the latter should not be used in amounts exceeding the solubility of the accelerator itself in rubber at ordinary room temperatures. This practice may be illustrated by the procedure of the following example:

EXAMPLE 14

Two GR-S compositions were prepared, in the first of which 0.9% of the accelerator produced according to Example 5 was used. In the second, 0.6% of this accelerator was used in conjunction with 0.25% of BTDS. The ingredients used and the physical properties of the product are shown in the following table:

Table V

| | Compounds | |
|---|---|---|
| | G | H |
| GR-S | 100 | 100 |
| EPC Black | 50 | 50 |
| Zinc Oxide | 5 | 5 |
| Sulfur | 2 | 2 |
| Coal Tar Softener | 5 | 5 |
| DOTG-DPG-BTDS Fusion Prod | 0.9 | 0.60 |
| BTDS | | 0.25 |

PHYSICAL TESTS

| | 60' Cure at 141° C. | |
|---|---|---|
| Modulus at 300% ¹ | 950 | 1,000 |
| Tensile Strength ¹ | 3,250 | 3,350 |
| Elongation, per cent | 650 | 645 |

¹ Pounds per square inch.

I claim:

1. As a new composition of matter, a low-softening point, amorphous, reaction product, prepared by admixing one mol part of benzothiazyl disulfide with about two mol parts of a member selected from the group consisting of the ditolyl guanidine, phenyl, tolyl guanidine, diphenyl guanidine, mixtures thereof and mixtures containing at least one of these guanidines and a dixylyl guanidine in which the dixylyl guanidine content does not exceed about 50 mol percent; heating the mixture to fusion temperature, in the case where diphenylguanidine is the only diarylguanidine used, the temperature used being above about 145° C.; holding the fused mixture at about the fusion temperature for about 1–15 minutes after the melt becomes clear and cooling the product to room temperature.

2. As a new composition of matter, an amorphous, low-softening point, reaction product, prepared by admixing one mol part of benzothiazyl disulfide with about two mol parts of mononuclear 1,3 di-o-tolyl guanidine; heating the mixture to fusion temperature; holding the fuzed mixture at about the fusion temperature for about 1–15 minutes after the melt becomes clear and cooling the product to room temperature.

3. As a new composition of matter, an amorphous, low-softening point, reaction product, prepared by admixing one mol part of benzothiazyl disulfide with about two mol parts of 1-phenyl, 3'-o-tolyl guanidine, heating the mixture to fusion temperature; holding the fused mixture at about the fusion temperature for about 1–15 minutes after the melt becomes clear and cooling the product to room temperature.

4. As a new composition of matter, an amorphous, low-softening point, reaction product, prepared by admixing one mol part of benzothiazyl disulfide with about one mol part of mononuclear 1,3 diphenyl guanidine and about one mol part of mononuclear 1,3 di-o-tolyl guanidine; heating the mixture to fusion temperature; holding the fused mixture at about the fusion temperature for about 1–15 minutes after the melt becomes clear and cooling the product to room temperature.

ARNOLD R. DAVIS.

REFERENCES CITED

The following references are of record in the file of this patent:

UNITED STATES PATENTS

| Number | Name | Date |
|---|---|---|
| 1,893,846 | Scott | Jan. 10, 1933 |
| 1,936,562 | Kilbourne, Jr. | Nov. 21, 1933 |

FOREIGN PATENTS

| Number | Country | Date |
|---|---|---|
| 413,296 | Great Britain | July 10, 1934 |